(12) United States Patent
Winter

(10) Patent No.: US 9,734,739 B2
(45) Date of Patent: Aug. 15, 2017

(54) BULLETIN BOARD

(71) Applicant: KISS-TECH TRADING COMPANY LIMITED, Ho Chi Minn (VN)

(72) Inventor: Robert Reynolds Winter, Ho Chi Minh (VN)

( * ) Notice: Subject to any disclaimer, the term of this patent is extended or adjusted under 35 U.S.C. 154(b) by 0 days.

(21) Appl. No.: 14/893,343

(22) PCT Filed: May 21, 2014

(86) PCT No.: PCT/IB2014/001230
§ 371 (c)(1),
(2) Date: Nov. 23, 2015

(87) PCT Pub. No.: WO2014/188271
PCT Pub. Date: Nov. 27, 2014

(65) Prior Publication Data
US 2016/0104398 A1    Apr. 14, 2016

(30) Foreign Application Priority Data

May 21, 2013   (AU) ................................ 2013901817

(51) Int. Cl.
| | |
|---|---|
| *B32B 5/18* | (2006.01) |
| *G09F 15/00* | (2006.01) |
| *B32B 5/32* | (2006.01) |
| *B32B 7/12* | (2006.01) |
| *G09F 1/10* | (2006.01) |
| *B32B 7/02* | (2006.01) |

(52) U.S. Cl.
CPC ................ *G09F 15/00* (2013.01); *B32B 5/18* (2013.01); *B32B 5/32* (2013.01); *B32B 7/02* (2013.01); *B32B 7/12* (2013.01); *G09F 1/10* (2013.01); *B32B 2250/03* (2013.01); *B32B 2250/04* (2013.01); *B32B 2250/22* (2013.01); *B32B 2250/40* (2013.01); *B32B 2266/025* (2013.01); *B32B 2307/3065* (2013.01); *B32B 2307/72* (2013.01)

(58) Field of Classification Search
CPC ............ B32B 2250/03; B32B 2250/04; B32B 2250/22; B32B 2250/40; B32B 2266/025; B32B 2307/3065; B32B 2307/72; B32B 5/18; B32B 5/32; B32B 7/02; B32B 7/12; G09F 15/00; G09F 1/10
USPC ........................... 428/212, 220, 304.4, 319.9
See application file for complete search history.

(56) References Cited

U.S. PATENT DOCUMENTS

| | | | | |
|---|---|---|---|---|
| 6,025,067 A | * | 2/2000 | Fay ........................ | B32B 27/08 428/314.4 |
| 6,423,402 B1 | | 7/2002 | Ali | |
| 2008/0061455 A1 | * | 3/2008 | Lundgreen ................ | F24F 6/18 261/115 |
| 2010/0175826 A1 | * | 7/2010 | Huenig ................... | C03C 25/26 156/296 |

FOREIGN PATENT DOCUMENTS

| | | |
|---|---|---|
| EP | 0871154 B1 | 3/2003 |
| JP | 2001-117517 A | 4/2001 |

\* cited by examiner

*Primary Examiner* — Aaron Austin
*Assistant Examiner* — Lawrence Ferguson
(74) *Attorney, Agent, or Firm* — Edwin D. Schindler

(57) ABSTRACT

A bulletin board includes a board having at least three layers of material, in which a first layer of material has a density of 20-50 kg/m$^3$, a second layer of material has a density of 140-170 kg/m$^3$ and a third layer of material has a density of 20-50 kg/m$^3$. The bulletin board has a front surface and a rear surface with an adhesive layer attached to the rear surface of the board, in which the adhesive layer enables the bulletin board to be attached to a support surface.

20 Claims, 2 Drawing Sheets

BULLETIN BOARD

FIELD OF THE INVENTION

The present invention relates to bulletin and message boards. In particular, but not exclusively, the present invention relates to a frameless bulletin board. However, it will be appreciated that the present invention has broader application and is not limited to that particular use.

BACKGROUND TO THE INVENTION

Bulletin boards are well known in the art, particularly in relation to office use for display and organisational purposes. The conventional bulletin board is generally made from a layer of cork material attached to a backing. A frame extending around the periphery of the bulletin board secures the cork material to the backing. The cork material provides a tackable surface and enables notes or other things to be attached to it via pins, thumbtacks, tacks or the like. Due to cork's elastic properties, the holes created by pins and tacks can close automatically upon removal of the spike, but heavy use over time destroys the cork material. Some bulletin boards have a fabric material covering the surface to protect the cork material. However, the fabric can tear and become unsightly over time with numerous hole marks, sagging and discolouration of the fabric.

Conventional bulletin boards are produced in a variety of sizes and generally have a frame which enables them to be attached to a wall using screws or the like. However, for large and custom sizes, measurement, manufacture and installation of the bulletin board can prove to be expensive, inconvenient and laborious.

The reference to any prior art in this specification is and should not be taken as, an acknowledgment or any form or suggestion that the prior art forms part of the common general knowledge.

In this patent specification and claims, the terms "comprise", "comprises", "comprising" or similar terms are intended to mean a non-exclusive inclusion, such that a bulletin board that comprises a list of elements does not include those elements solely, but may well include other elements not listed.

OBJECT OF THE INVENTION

It is an object of the present invention to provide a bulletin board, that addresses or at least ameliorates one or more of the aforementioned problems of the prior art and/or provides a consumer with a useful or commercial choice.

SUMMARY OF THE INVENTION

Generally, embodiments of the present invention relate to a frameless bulletin board that provides a continuous pin board which is easy to install and extends the life of the bulletin board.

According to one aspect, although not necessarily the broadest aspect, the present invention resides in a bulletin board comprising:

a board having at least one layer of material, the board having a front surface and a rear surface; and an adhesive layer attached to the rear surface of the board;

wherein the adhesive layer enables the bulletin board to be attached to a support surface.

Preferably, the board is in the form of a continuous pin board.

Preferably, the material is a foam material.

Preferably, the foam material is a polyethylene (PE) foam material.

Preferably, the foam material is a resin low-density polyethylene (LDPE) non-cross linked foam material.

Suitably, the density of the foam material is 48-52 gm/m$^2$.

Preferably, the board comprises between two to four layers of material.

Preferably, the adjacent layers of material are secured together via a suitable adhesive material or substance.

Preferably, the adhesive layer is secured to the rear surface of the board via a suitable adhesive material or substance.

Preferably, a rear surface of the adhesive layer is adapted to receive a protective sheet releasably attached thereto.

Preferably, an inner surface of the protective sheet is coated with a release agent to enable it to be releasably attached to the adhesive layer so as to protect the adhesive layer prior to use.

Preferably, the front surface is adapted to receive one or more items, such as notes, display material, information, photos or the like, attached thereto for display, presentation or organisational purposes or similar.

Preferably, the items are attached to the front surface of the board using one or more fasteners.

Preferably, the fastener is in the form of pins, thumbtacks, tacks or other pin-type fasteners.

Further features and forms of the present invention will become apparent from the following detailed description.

BRIEF DESCRIPTION OF THE DRAWINGS

In order that the invention may be readily understood and put into practical effect, reference will now be made to embodiments of the present invention with reference to the accompanying drawings, wherein like reference numbers refer to identical elements. The drawings are provided by way of example only, wherein.

Figure 1:
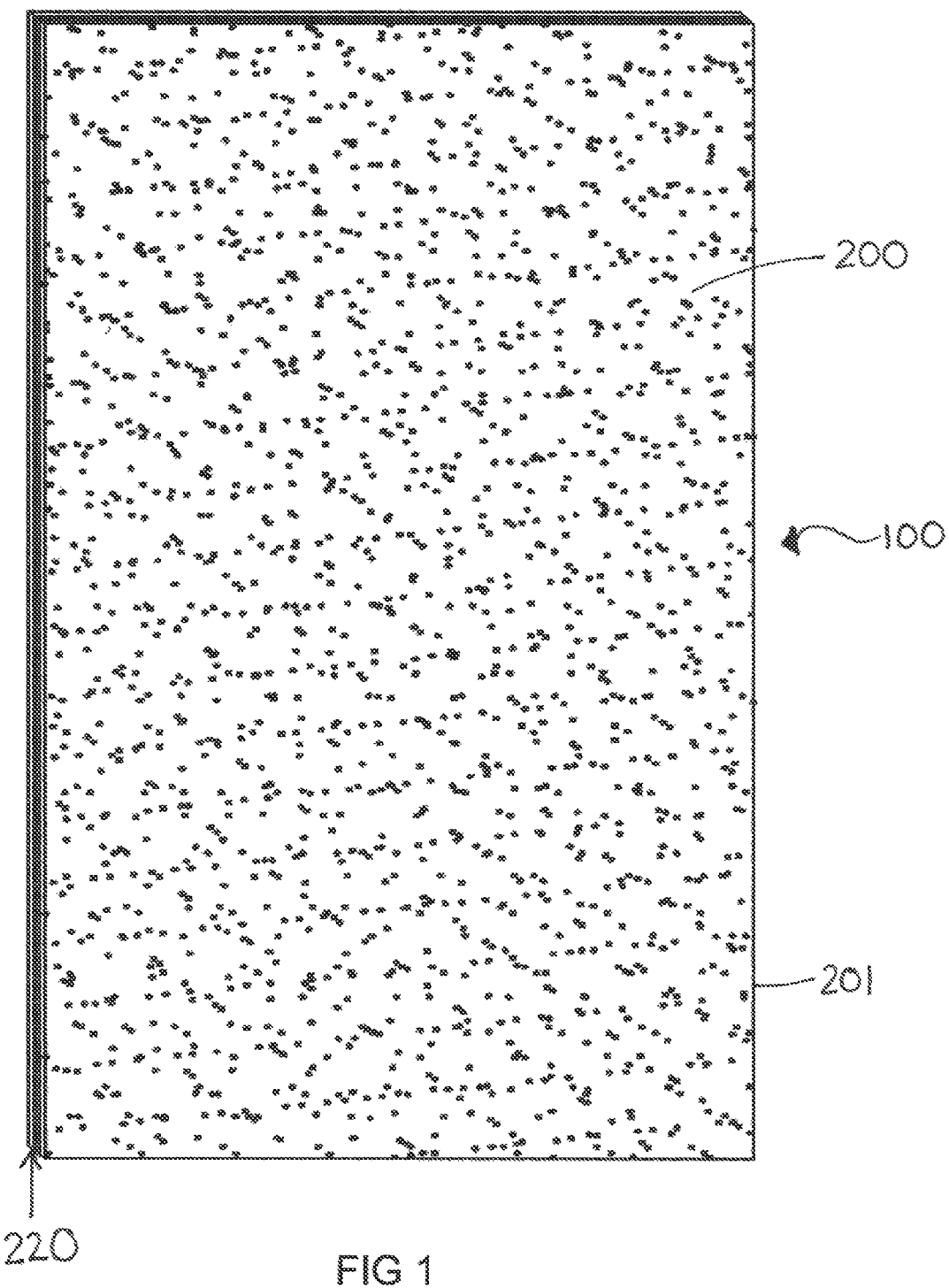
FIG. 1 is a front perspective view of the bulletin board according to an embodiment of the present invention.

Skilled addressees will appreciate that elements in the drawings are illustrated for simplicity and clarity and have not necessarily been drawn to scale. For example, the relative dimensions of some of the elements in the drawings may be distorted to help improve understanding of embodiments of the present invention.

DETAILED DESCRIPTION OF THE INVENTION

Embodiments of the present invention will be described with reference to a frameless bulletin board that provides a continuous pin board which is easy to install and increases the lifetime of the bulletin board. For convenience sake, the bulletin board will be described herein as a board for office use for display, presentation and organisational purposes. However, it should be appreciated that embodiments of the present invention can be modified to suit other applications. It will be appreciated that variations may need to be made as required.

Referring to FIG. 1, a bulletin board 100 is provided in accordance with embodiments of the present invention. The bulletin board 100 comprises a board 200 in the form of a continuous pin board. According to a preferred embodiment of the present invention, the board 200 is made of a plastic foam material. The material is a polyethylene (PE) foam material. However, in an alternative embodiment, it is envisaged that any other suitable material which satisfies the objectives of the present invention could also be used. Preferably, the structure of the foam material is a resin low-density polyethylene (LDPE) non-cross linked foam material. It is envisaged that the dimensions of the bulletin board 100 can varied such that the bulletin board 100 can be made and/or cut to any desired size. It can also be produced in a number of standard sizes which are deemed popular to consumers. The material is preferably clean cut along the peripheral edges 201 to provide a neat appearance. In an alternative embodiment of the present invention, it is envisaged that the peripheral edges 201 may be rounded or beveled for safety and/or to create a different appearance for the bulletin board.

Figure 2:
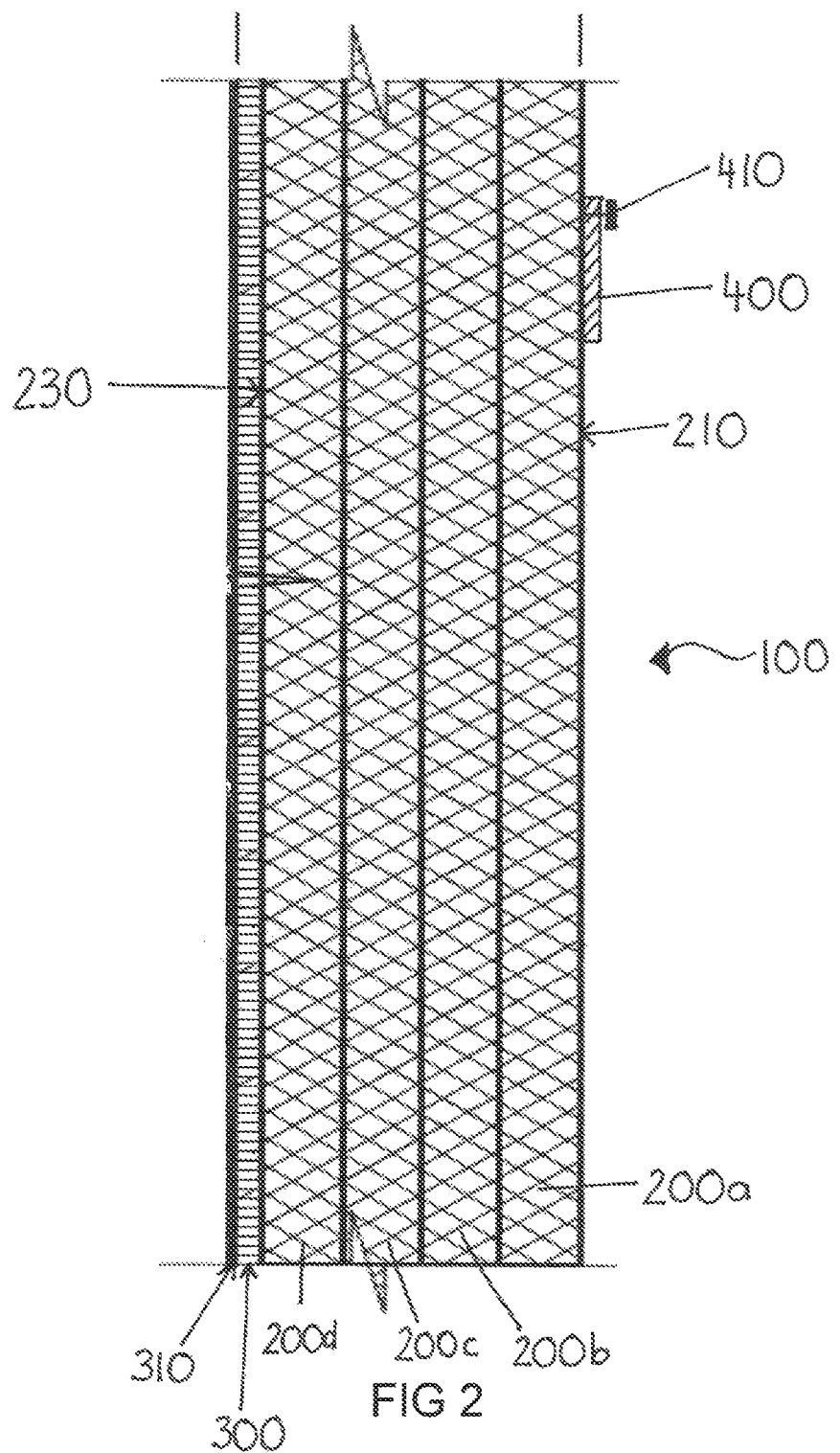
FIG. 2 is a sectional side view of the bulletin board of FIG. 1 according to an embodiment of the present invention.

The board 200 comprises at least one layer of plastic foam material 220. According to one embodiment of the present invention, the board 200 comprised four layers 220a, 220b, 220c, 220d of plastic foam material, as illustrated in FIG. 2. However, it will be acknowledged that in alternative embodiments, the number of layers can be varied such that the board 200 comprises between two to four layers. In yet another alternative embodiment, a single layer could also be adopted. The thickness of each layer 220a, 220b, 220c, 220d, is three millimeters to produce an overall thickness of twelve millimeters for the board 200. The desired thickness for the bulletin board 100 is between ten to thirteen millimeters. However, in an alternative embodiment it is envisaged that any other suitable thickness could also be employed. The adjacent layers 200 of foam material are secured together via a suitable adhesive material or substance (not illustrated). The adhesive can be any suitable liquid or solid adhesive commonly known in the art. The adhesive can be applied as a coating to abutting surfaces of the adjacent layers of foam material to secure the adjacent layers together. For example, a coating of adhesive can be applied to a rear surface of the first layer 200a and a front surface of a second layer 200b to secure the first layer 200a and the second layer 200b together. In an alternative embodiment, it is envisaged that the adjacent layers could be secured to each other via heat sealing or any other suitable method and/or substance.

The bulletin board 100 comprises a front surface 210 which is adapted to receive one or more items 400, such as notes, display material, information, photos or the like, attached thereto for display, presentation or organisational purposes or similar. The items 400 are attached to the front surface 210 of the board 200 using one or more fasteners 410. The fastener 410 is in the form of pins, thumbtacks, tacks or other pin-type fasteners commonly known in the art. The density of the material of the board 200 of the bulletin board 100 is designed to be soft enough for a pin 410 to penetrate the material but firm enough to securely hold the pin in place, without leaving a large hole when the pin 410 is removed. In a preferred embodiment, the density of the foam material is 48-52 gm/m$^2$. However, it is envisaged that any other suitable density could be used and/or varied to suit different material compositions. The material and density of the board minimises unsightly holes which are generally left in conventional bulletin boards over time and results in increased longevity for the bulletin board 100.

The board 200 comprises a rear surface 230 for receiving an adhesive layer 300 to be attached thereto. The adhesive layer 300 enables the bulletin board 100 to be attached to a support surface, such as a wall or the like. The adhesive layer is adapted to be attached to the rear surface 230 of the board 200 via a suitable adhesive material or substance commonly known in the art. A rear surface of the adhesive layer 300 receives a protective sheet 310 which is adapted to be releasably attached thereto. The protective sheet 310 is coated with a release agent on a side abutting the adhesive layer 300 to enable it to be releasably attached to the adhesive layer 300 so as to protect the adhesive layer 300 prior to use. Once the protective sheet 310 is removed, the bulletin board 100 can be attached to a support surface via the adhesive layer 300 which provides a sticky surface for rear of the bulletin board 100. The thickness of the adhesive layer is preferably 0.13 mm. However, it is envisaged that any suitable thickness could be employed.

Hence, the bulletin board 100 provides a solution to the aforementioned problems of the prior art by providing a frameless bulletin board 100 that provides a continuous pin board which is easy to install and increases the appearance and life of the bulletin board. The plastic foam material is such that pin marks are minimal and therefore will not become unsightly over time. The plastic foam material can be coloured throughout to provide a decorative finish for the bulletin board 100 and ensure that the bulletin board 100 will not become discoloured over time. Furthermore, the plastic foam material can be easily wiped clean and is fire resistant to provide a safe solution for use in an office or home or other suitable environment.

Throughout the specification the aim has been to describe the invention without limiting the invention to any one embodiment or specific collection of features. Persons skilled in the relevant art may realize variations from the specific embodiments that will nonetheless fall within the scope of the invention.

I claim:

1. A bulletin board, comprising:
    a board having at least three layers of a polyethylene cross-linked closed cell foam material, wherein a first layer of material has a density of 50 kg/m$^3$, a second layer of material has a density of 140-170 kg/m$^3$ and a third layer of material has a density of 50 kg/m$^3$, the board having a front surface and a rear surface; and,
    an adhesive layer attached to the rear surface of the board, wherein the adhesive layer enables the bulletin board to be attached to a support surface.

2. The bulletin board according to claim 1, wherein adjacent layers of material are secured together via an adhesive substance.

3. The bulletin board according to claim 1, wherein the adhesive layer is secured to the rear surface of the board via an adhesive.

4. The bulletin board according to claim 1, wherein a rear surface of the adhesive layer is capable of receiving a protective sheet releasably attached thereto.

5. The bulletin board according to claim 4, wherein an inner surface of the protective sheet is coated with a release agent for enabling the protective sheet to be releasably attached to the adhesive layer for protecting the adhesive layer prior to use.

6. The bulletin board according to claim 1, wherein the front surface is capable of receiving an item to be displayed on the bulletin board via a fastener.

7. The bulletin board according to claim 6, wherein the bulletin board is capable of holding 250-300 grams per fastener.

8. A bulletin board, comprising:
    a board having at least three layers of material, wherein a first layer of material has a density of 20-50 kg/m$^3$, a second layer of material has a density of 140-170 kg/m$^3$ and a third layer of material has a density of 20-50 kg/m$^3$, the board having a front surface and a rear surface, wherein each of said at least three layers of material is a foam material and the foam material of the first layer and of the third layer of material is a polyethylene non-cross-linked closed cell material and the foam material of the second layer is a polyethylene cross-linked closed cell material; and, an adhesive layer attached to the rear surface of the board, wherein the adhesive layer enables the bulletin board to be attached to a support surface.

9. The bulletin board according to claim 8, wherein the first layer of material and the third layer of material each have a density of 50 kg/m$^3$.

10. The bulletin board according to claim 8, wherein adjacent layers of material are secured together via an adhesive substance.

11. The bulletin board according to claim 8, wherein the adhesive layer is secured to the rear surface of the board via an adhesive.

12. The bulletin board according to claim 8, wherein a rear surface of the adhesive layer is capable of receiving a protective sheet releasably attached thereto.

13. The bulletin board according to claim 12, wherein an inner surface of the protective sheet is coated with a release agent for enabling the protective sheet to be releasably attached to the adhesive layer for protecting the adhesive layer prior to use.

14. The bulletin board according to claim 8, wherein the front surface capable of receiving an item to be displayed on the bulletin board via a fastener.

15. The bulletin board according to claim 14, wherein the bulletin board is capable of holding 250-300 grams per fastener.

16. A bulletin board article, comprising:

a bulletin board having at least three layers of a polyethylene cross-linked closed cell foam material, wherein a first layer of material has a density of 20-50 kg/m$^3$, a second layer of material has a density of 140-170 kg/m$^3$ and a third layer of material has a density of 20-50 kg/m$^3$, the bulletin board having a front surface and a rear surface, the front surface of said bulletin board being a display surface for a display item fastened thereto;

means for fastening the display item to the front surface of said bulletin board; and, an adhesive layer attached to the rear surface of the bulletin board, wherein the adhesive layer enables the bulletin board article to be attached to a support surface.

17. The bulletin board article according to claim 16, wherein adjacent layers of material are secured together via an adhesive substance.

18. The bulletin board article according to claim 16, wherein the adhesive layer is secured to the rear surface of the board via an adhesive.

19. The bulletin board article according to claim 16, wherein a rear surface of the adhesive layer is capable of receiving a protective sheet releasably attached thereto.

20. The bulletin board article according to claim 19, wherein an inner surface of the protective sheet is coated with a release agent for enabling the protective sheet to be releasably attached to the adhesive layer for protecting the adhesive layer prior to use.

* * * * *